United States Patent [19]

Jerman et al.

[11] Patent Number: 5,533,412

[45] Date of Patent: Jul. 9, 1996

[54] PULSED THERMAL FLOW SENSOR SYSTEM

[75] Inventors: John H. Jerman, Palo Alto, Calif.; Ronald E. Toth, Grayslake, Ill.; David A. Winchell; David W. Pennington, both of Fox Lake, Ill.

[73] Assignees: IC Sensors, Inc., Milpitas, Calif.; Baxter International Inc., Deerfield, Ill.

[21] Appl. No.: 479,247

[22] Filed: Jun. 7, 1995

Related U.S. Application Data

[63] Continuation of Ser. No. 364,067, Dec. 27, 1994, abandoned, which is a continuation of Ser. No. 88,141, Jul. 7, 1993, abandoned.

[51] Int. Cl.$^6$ .................................................. G01F 11/68
[52] U.S. Cl. ........................................ 73/861.95; 73/204.26
[58] Field of Search ........................... 73/861.05, 861.95, 73/204.26

[56] References Cited

U.S. PATENT DOCUMENTS

| | | | |
|---|---|---|---|
| 2,776,565 | 1/1957 | Hudson | 73/861.95 |
| 3,543,578 | 12/1970 | Sampson | 73/861.95 |
| 3,871,229 | 3/1975 | Fletcher | 73/204 |
| 4,228,683 | 10/1980 | Juffa et al. | 73/204 |
| 4,237,730 | 12/1980 | Feng | 73/861.95 |
| 4,335,616 | 6/1982 | Oliva et al. | 73/861.05 |
| 4,346,603 | 8/1982 | Schmid | 73/861.05 |
| 4,502,339 | 3/1985 | Horn | 73/861.95 |
| 4,542,650 | 9/1985 | Renken et al. | 73/204.26 |
| 4,628,743 | 12/1986 | Miller et al. | 73/861.05 |
| 4,685,331 | 8/1987 | Renken et al. | 73/204 |
| 4,813,280 | 3/1989 | Miller, Jr. et al. | 73/861.95 |
| 4,932,250 | 6/1990 | Assaf et al. | 73/204.24 |
| 4,995,268 | 2/1991 | Ash et al. | 73/861.05 |
| 5,243,858 | 9/1993 | Erskine et al. | 73/861.95 |
| 5,347,876 | 9/1994 | Kang et al. | 73/861.95 |

FOREIGN PATENT DOCUMENTS 2934565 3/1981 Germany.

*Primary Examiner*—Richard Chilcot
*Assistant Examiner*—Harshad Patel
*Attorney, Agent, or Firm*—Skjerven, Morrill, MacPherson, Franklin & Friel; Norman R. Klivans

[57] ABSTRACT

A precise fluid flow meter fabricated by micromachining techniques measures a wide range of fluid flow rates. Two serial portions of an enclosed channel have different cross-sectional areas, and therefore different flow velocities. The fluid carries the thermal pulse through the flow channel to two sensor elements spaced apart along the channel downstream from the heating element. The transit time of the thermal pulse between the two sensor elements measures the fluid flow velocity.

7 Claims, 9 Drawing Sheets

PULSED THERMAL FLOW SENSOR SYSTEM

This application is a continuation of application Ser. No. 08/364,067 abandoned, filed Dec. 27, 1994, which is a continuation of application Ser. No. 08/088,141, filed Jul. 7, 1993 (abandoned).

BACKGROUND OF THE INVENTION

1. Field of the Invention

This invention relates to a fluid flow meter and system for using same, and specifically to a flow meter formed by micromachining and having a channel with portions of different cross-sectional area, and including a pulsed heating element and two spaced-apart downstream heat sensors for precisely measuring fluid velocity.

2. Description of the Prior Art

It is known to introduce heat into a fluid stream to measure fluid flow. One such device includes two heating elements placed in the fluid stream; both elements are electrically heated and cooled by a stream of fluid. The upstream element is cooled by the fluid stream more than the downstream element, and the measured temperature difference between the two elements indicates flow.

Another method employs a heating element, a temperature sensor upstream from the heating element, and a temperature sensor downstream from the heating element. Fluid passes by the upstream sensor and is then heated by the heating element, while the heated fluid continues on to the downstream sensor. The measured temperature difference between the upstream and downstream sensors determines flow rates. Both the two and three element configurations described above have been formed using semiconductor micromachining technology.

To accurately measure flow using these techniques without calibration, the specific heat and thermal conductivity of the fluid and the various components of the flow meter must be known precisely. Moreover, the effects of thermal conductivity vary with changes in flow rate, ambient temperature, fluid temperature, fluid type, and fluid concentration. One method of compensating for thermal conduction losses includes adding another sensing element in a closed off channel to compensate the device for thermal conduction losses. In a gas application, this is relatively easy; however, in a liquid application, it is difficult to ensure this dead-end channel becomes primed.

Other thermal flow meters overcome some of the above disadvantages. One such approach (Miller, Jr. et al., U.S. Pat. No. 4,532,811) applies a thermal pulse to a stream of fluid and has a single downstream heat sensor to sense the thermal pulse. The transit time between the heating element and the heat sensor determines flow velocity. The Miller thermal pulse technique is effective over a wide range of fluid temperatures, because the unheated fluid is used as a reference: the downstream sensor detects thermal pulses, i.e. envelopes of fluid traveling through the flow channel that are warmer than the unheated fluid. Therefore, the thermal pulse technique is advantageously insensitive to changes in ambient temperature.

A major disadvantage of Miller's approach is that there is a delay associated with the transfer of heat to and from the fluid. This delay is associated with the thermal masses, thermal conductivities, and heat-transfer coefficients of the heating element, sensor, and fluid, and must be accounted for when calculating flow rates. Since the delay is related to the properties of the fluid, the flow meter inconveniently must be recalibrated for different types and concentrations of fluids.

SUMMARY OF THE INVENTION

A device and method for measuring flow in accordance with the present invention provide power pulses to a heating element and thereby inject a small thermal marker (pulse or signal) into a stream of fluid (gas, liquid, or a combination thereof) traveling through an enclosed flow path of known cross-sectional area. Two or more sensors, spaced apart downstream from the heating element, detect the passage of the thermal marker. The thermal marker may be, alternatively to a pulse, a pulse superimposed on a baseline heating level, or e.g. a sinusoidal signal. The method to determine flow rate measures the time between markers. In one version this time is the peak at the first sensor to the peak at the second sensor. This is done in one embodiment electronically by differentiating the amplified signals, then using comparator circuits to find the zero-crossing points, and thereby producing a digital pulse with a length approximately equal to the time between the peaks. Alternatively, a leading edge of the marker is detected by the sensors.

A flow meter's dynamic range limits are defined by the minimum and maximum measured flow rates. At high flow velocities, fluid passes by the heating element too quickly to allow sufficient heat to transfer from the heating element to the fluid, and from the fluid to the downstream sensors. At low flow velocities, results are poor because the thermal pulse dissipates in the fluid.

To improve dynamic range, one embodiment of the present invention measures velocity in two portions of the channel, the portions having different cross-sectional areas, thereby providing different flow velocities. The narrower channel portion is used for measuring low flows, and the wide channel portion is used for measuring higher flows. This combines the dynamic ranges of the two portions, thereby substantially increasing the overall dynamic range of flow meter.

The flow sensor in one embodiment is a silicon chip made by microetching a silicon substrate and film deposition techniques. Such sensors find particular utility in a wide variety of medical applications, such as precise intravenous drug delivery.

More particularly, a heating element and the heat sensors are formed in situ on integral members bridging across or extending into a channel of the substrate. The bridging members are formed by deposition and etching, followed by etching the channel in the substrate to define the lower half of the flow path. A glass or silicon cover with a channel similar to that etched in the substrate is bonded to the substrate. The channel on the substrate and the channel on the cover are aligned to form an enclosed flow path of known cross-sectional area. The heating element and sensors are deposited on the bridging members which traverse the enclosed flow path, and so are in thermal contact with the fluid stream. In one embodiment, the bridging members approximately bisect the enclosed flow path formed by the substrate and matching cover. Also, the heating element and sensors in one embodiment are active only in the central portion (away from the sidewalls) of the channel.

An advantage of this device (unlike many prior art flow sensors) is that individual flow sensors need not be calibrated once the design has been characterized if fabrication process tolerances are precisely maintained. If the flow channel cross-sectional area and sensor spacing are maintained within a desired range (which is easily achievable using conventional semiconductor and micromachining processing techniques) then volume and flow calculations can be made to achieve a result relatively insensitive to any other parameters, including fluid properties, exact heater and sensor characteristics, or exact electronic gains or offsets. In addition, accuracy over a range of ambient and fluid temperatures is also maintained. Thus instead of measuring temperature directly, a time value determined by flow rate is measured, removing any first order calibration effects.

Fabrication by micromachining has the additional advantage of enabling manufacture of extremely small flow meters. As a result, many flow meters may be fabricated simultaneously, lowering cost per unit. Moreover, small size enables measurement of very low flow rates given precise manufacturing tolerances.

A flow meter in accordance with the invention is useful with a closed loop flow control system for delivery of intravenous drugs. In accordance with one embodiment, in this application it is possible to deliver flow rates of 0.3 ml per hour to 125 ml per hour. In the prior art, closed loop control at such low flow rates is not possible without prohibitively expensive components. The flow meter of the present invention uses relatively inexpensive and hence potentially disposable components. Such a closed loop control system, using a conventional solenoid-operated valve, delivers fluid at user selected flow rates from an intravenous bag or from a source of pressurized liquid, such as an elastomeric balloon serving as a liquid reservoir in an infuser. Delivery at low flows is by controlling the duty cycle of the valve, and integrating valve flow over time to determine volume delivered. A low flow measurement is made to compensate for leakage when the valve is nominally off.

BRIEF DESCRIPTION OF THE DRAWINGS

FIG. 2 shows an exploded cross-sectional view of the wide portion of the flow path of FIG. 1a.

FIG. 3 shows an exploded cross-sectional view of the narrow portion of the substrate channel of FIG. 1a.

FIG. 4b shows circuitry for use with the device of FIG. 1a.

FIGS. 5a to 5d show fabrication of the device of FIG. 1a.

DETAILED DESCRIPTION OF THE INVENTION

Figure 1A:
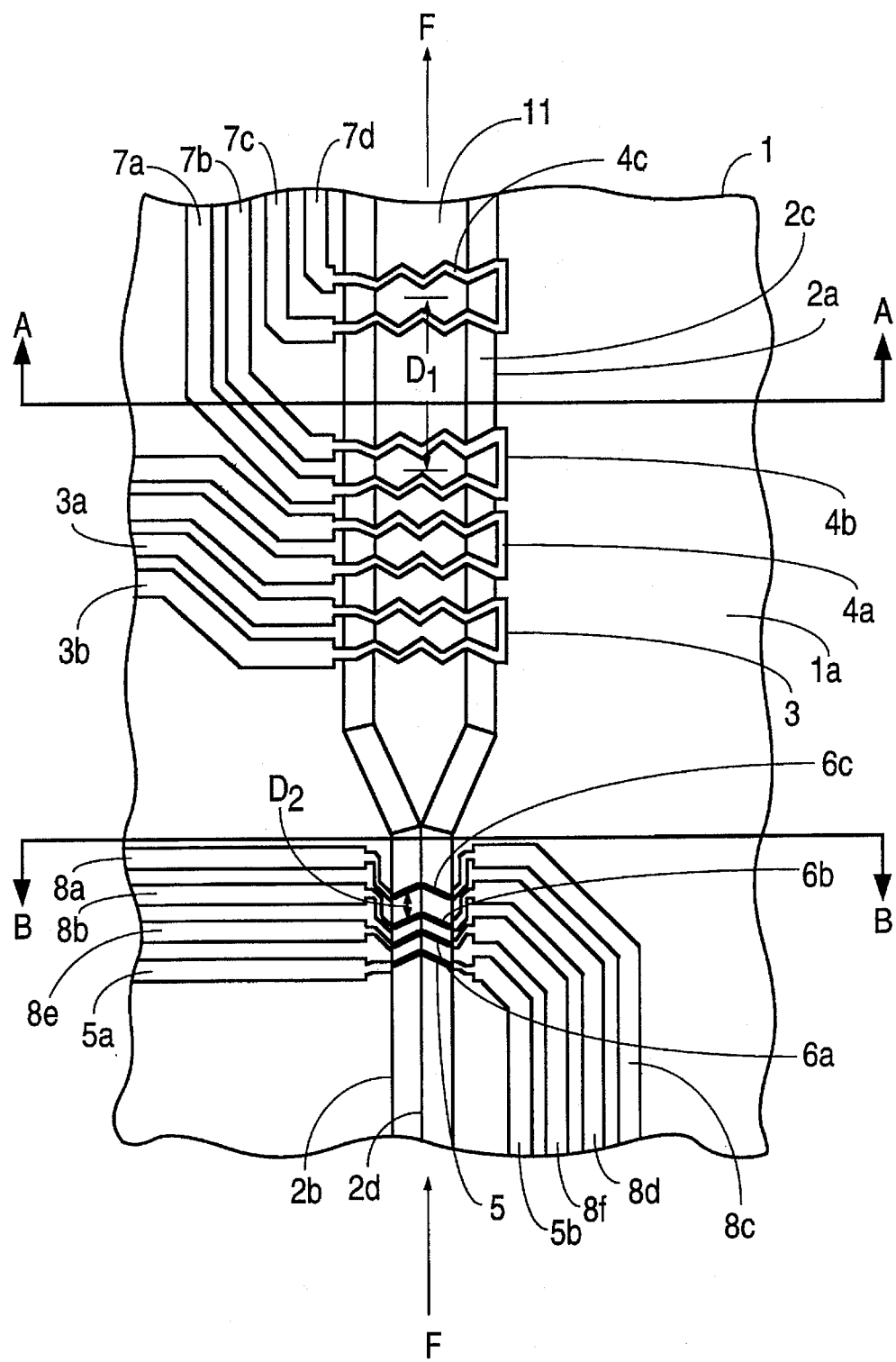
FIG. 1a shows a plan view of the surface of a device in accordance with the invention.

FIG. 1a shows a plan view drawn to scale of a portion of the surface of a silicon substrate 1 (in one embodiment measuring 2.5 mm×5 mm at any convenient thickness) in accordance with one embodiment of the present invention. (It is to be understood that materials other than those disclosed herein may also be used). In the surface of substrate 1 is etched a channel, having a wide portion 2a and a narrow portion 2b.

Figure 2:
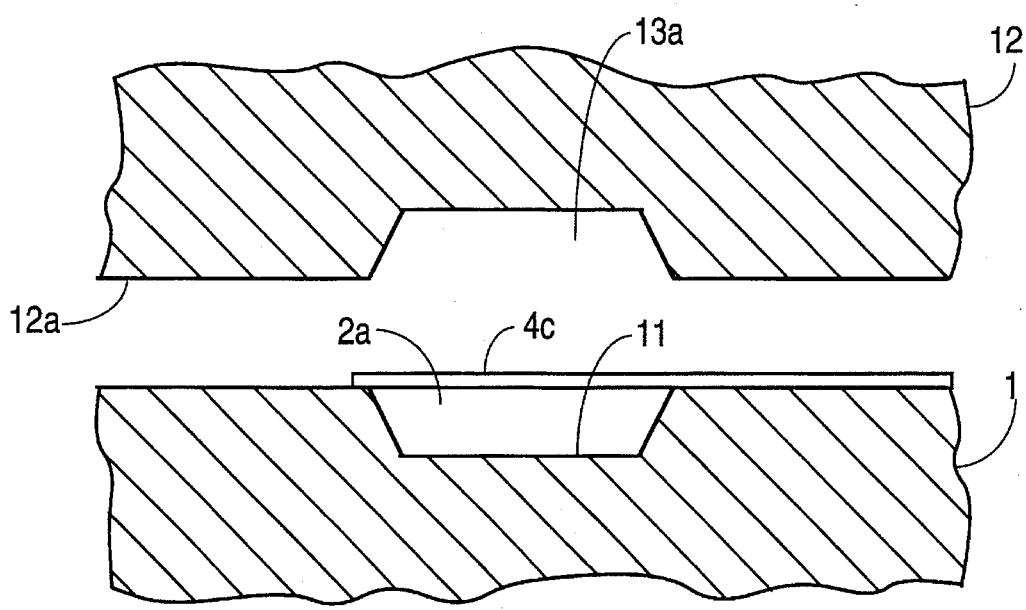
Figure 3:
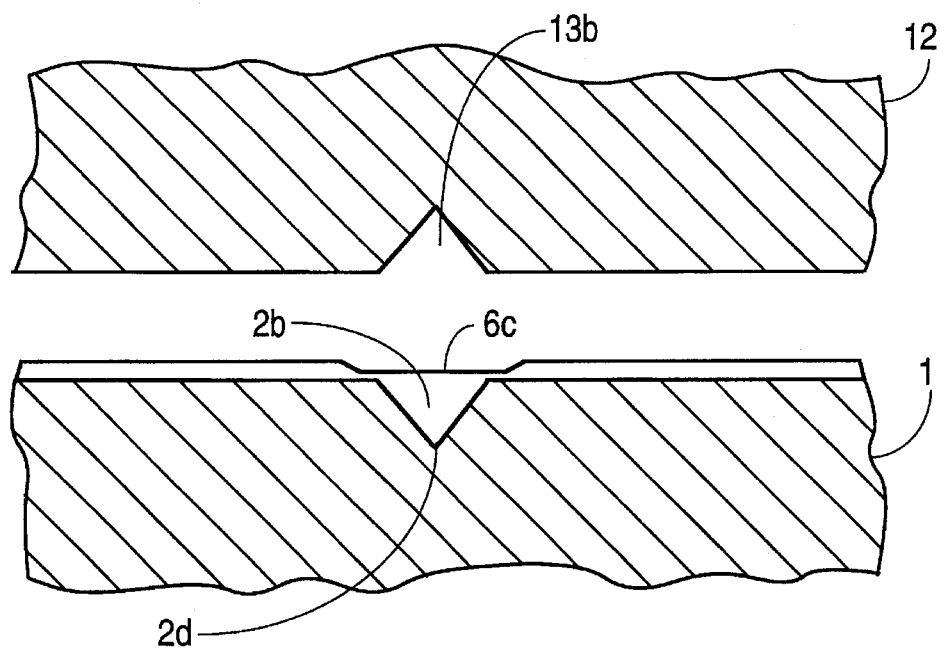

FIGS. 2 and 3 show cross-sectional views of a glass or silicon cover 12 and the substrate 1 as viewed along line B—B and line A—A, respectively, in FIG. 1a. A groove (channel) 13a in FIG. 2 and 13b in FIG. 3 is etched in a surface 12a of cover 12, the groove having wide and narrow portions corresponding to the wide and narrow portions of the channel 2a, 2b of substrate 1. The cover 12 is anodically (or wafer) bonded to the substrate 1 so that the channel 13a, 13b of cover 12 aligns with the channel 2a, 2b of substrate 1 to form a flow path for fluids.

Referring again to FIG. 1a, the wide portion 2a of substrate 1 is traversed by a heating element 3 and heat sensors 4a, 4b, and 4c, which are located downstream along the channel with respect to the direction of flow F. Heating element 3 has a zig-zag shape because of the need for a silicon fabrication etching step to undercut the heating element 3 which is a bridge formed in substrate 1 traversing the channel. This is because for a sensor aligned along the <110> direction with substrate 1, which is the direction that an etched V-groove (as is the channel) forms on a {100} oriented silicon wafer, a sensor element 3 formed straight across a groove (channel) will not be undercut.

Similarly, the narrow channel portion 2b is traversed by a chevron-shaped heating element 5 and downstream heat sensors 6a, 6b, and 6c. Structurally and electrically, element 3 and associated sensors 4a, 4b, and 4c are identical, as are element 5 and associated sensors 6a, 6b, 6c.

When the cover 12 and substrate 1 are bonded, the heating elements 3, 5, and sensors 4a, 4b, 4c, 6a, 6b, 6c bisect the flow path formed between substrate 1 and glass cover 12, and are therefore in contact with the fluid stream. Traces 3a and 3b provide power to heating element 3, while traces 7a, 7b, 7c, and 7d provide a signal path for sensors 4b and 4c. In the narrow portion of the channel 2b, traces 5a and 5b provide power to heating element 5, while traces 8a, 8b, 8c, and 8d, 8e, 8f provide a signal path for sensors 6a, 6b and 6c. Traces 3a, 3b, 7a, 7b, etc. are about 5 µm wide and 3000 Å thick. Alternatively, in another embodiment any of elements 3, 4a, 4b, 4c, 5, 6a, 6b, 6c cross channel 2b only once (instead of twice as in FIG. 1) with connecting traces formed on both sides of channel 2b.

To measure the flow of fluid through the wide portion of the flow path, external circuitry (described below) provides power pulses to the heating element 3 and thereby forms a small thermal marker (pulse) in the fluid stream. This thermal marker is carried downstream by the fluid where it sequentially encounters sensors 4a, 4b and 4c. The transit time $T_t$ of the thermal pulse between for instance downstream sensors 4b and 4c is a representative time measure of the flow velocity of the fluid inside the enclosed flow path. (It has been found experimentally that at flow rates of 2 to 20 mL/hour that the relationship between indicated velocity and flow rate is not linear or accurately predictable without calibration of a particular design. This is because the sense elements slow down the flow in their vicinity.) Because the cross-sectional area $A_1$ of the wide portion of the enclosed path is known, as is the distance $D_1$ between sensors 4b and 4c, the volume $V_1$ between downstream sensors 4b and 4c is easily determined. ($V_1 = A_1 \times D_1$). Flow F, in volume per unit time, is approximated by dividing the volume $V_1$ by the transit time $T_1$ ($F = V_1 \div T_1$) and is normally expressed in cubic centimeters per hour (cc/hr).

Thus, because volume $V_1$ and spacing $D_1$ are precisely known, nominal flow F may be calculated regardless of the exact thermal conductivity, density, or concentration of the fluid. Because the cross-sectional area $A_2$ of the narrow portion of the flow path and the distance $D_2$ between sensors 6b and 6c are also precisely known, nominal flow F may likewise be calculated in the narrow portion of the flow path. Under conditions of very low flow, the thermal pulse may dissipate before it reaches the far downstream sensor. Under these flow conditions, the difference in transit time between the two flow sensors obviously cannot be measured. The dynamic range of the device can be increased, therefore, if for very low flows the transit time from the heater to the first downstream sensor can be measured, with the appropriate calibration factors.

In one embodiment of the present invention, the spacing $D_1$ between sensors 4b and 4c is 325 μm from center to center. The same spacing is used between heater element 3 and sensor 4b. The spacing is generally not a critical dimension. It is preferred to operate the device with a very low Reynolds number. For a cylindrical tube-shaped channel, it is well known that the flow is zero at the walls, and the average velocity is exactly half of peak velocity; the same is true across the height of a wide rectangular channel. The sensors tend to average the flow velocity to which they are exposed. That is, the very center of each sensor such as 4b, 4c will observe the heat pulse before the outside part of the sensor does so.

Thus depending on the exact heater and sensor geometry, the transit time as measured by the thermal pulse will be intermediate between the average fluid transit time and the peak fluid transit time. This relationship must be determined for any particular sensor geometry, and a single factor can be introduced to more accurately relate the measured cross sectional area and thermal transit time to the fluid flow. Since the parabolic flow profile holds over the entire range of laminar flow, this factor does not need to be adjusted over the operating flow range of the device.

Figure 1B:
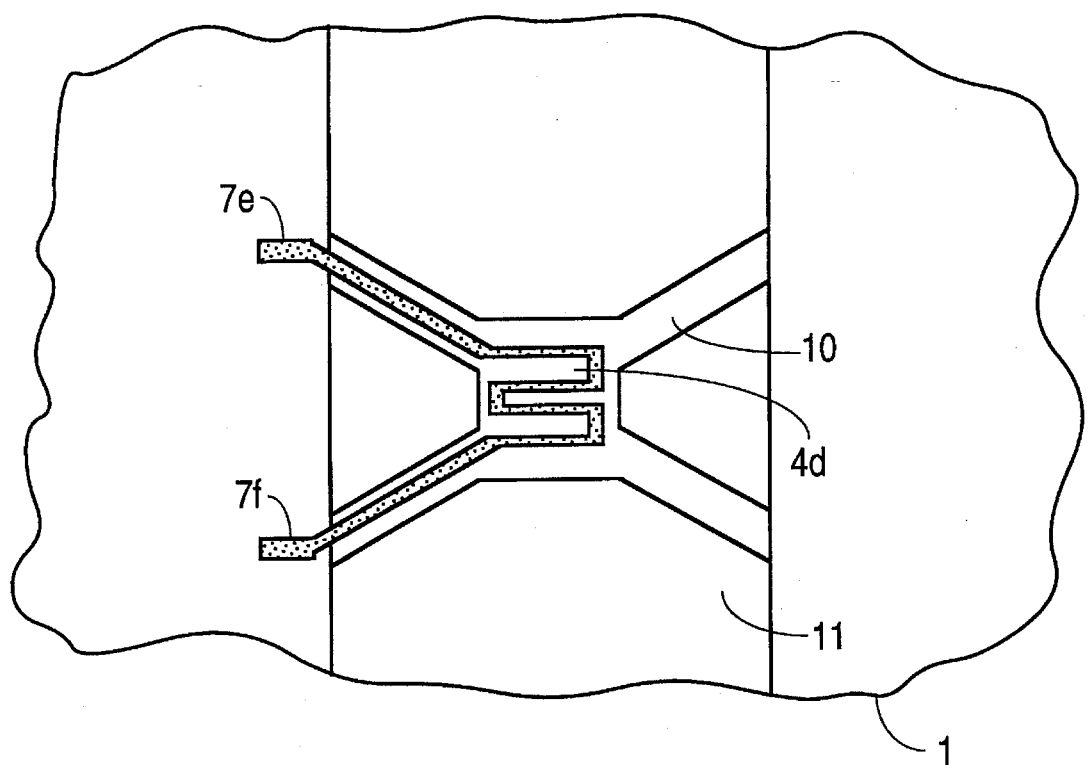
FIG. 1b shows a plan view of a second embodiment of a heater element or sensor.

In another embodiment, each heater and sensor element is active only in the center of the channel. This measures flow closer to the peak rather than the average. Such structures for instance extend the sensor/heater trace metallization partway across the channel. This embodiment of the heater and/or sensor elements is shown in FIG. 1b, showing in plan view (as in FIG. 1a) a single e.g. heater element 4d which is supported on a support structure 10 suspended over flow channel 11. Low resistance connections (traces) 7e, 7f connect to serpentine heater (or sensor) element 4d. By having the heater and/or sensors active only in the central portion of the flow channel (such as the central ⅓ thereof) one achieves more accurate flow detection by reducing flow effects at the flow channel walls.

In one embodiment, the flat bottom 11 (see FIG. 2) of the wide portion of the channel 2a is 220 μm wide and etched 80 μm into the substrate 1. The width of channel 2a at the surface 1a is 300 μm. The channel 2a cross-sectional area, taking into account the angled sides 2c of channel 2a but ignoring the heating and sensing elements is $23.4 \times 10^3$ μm². The glass cover (cap) 12 is isotropically etched, so its etched profile is not exactly symmetric with the substrate groove which is anisotropically etched. The wide portion of the channel 13a is etched 88 μm deep. The resulting cross-sectional area is approximately equal to that of the wide channel 2a of the substrate 1. Thus, the cross-sectional area of the wide portion of the flow path is approximately twice the cross-sectional area of the wide portion of the channel 2a of substrate 1, or $46.8 \times 10^3$ μm², and the volume $V_1$ of the portion of the flow path between sensors 4b and 4c is the cross-sectional area $A_1$ times the distance $D_1$ between sensors 4b and 4c, or $15.2 \times 10^6$ μm³. Dividing the constant $V_1$ by the transit time $T_1$ of the thermal pulse between sensors 4b and 4c results in the flow rate F in volume per unit time.

Similarly, the flow of fluid in the narrow portion 2b of the channel may be accurately calculated as the cross-sectional area $A_2$ of the narrow portion of the flow path multiplied by the distance $D_2$ between sensors 6b and 6c, and divided by the transit time $T_2$ of the thermal pulse as it travels between sensors 6b and 6c. In one embodiment, the sensor spacing $D_2$ between sensors 6b and 6c is 70 μm, the cross-sectional area $A_2$ of the narrow portion 2b of the flow path is $7.0 \times 10^3$ μm² and the volume $V_2$ is $4.9 \times 10^5$ μm³.

Given the relatively small cross-sectional areas of both the wide and narrow regions of the flow path, the power required to provide the necessary thermal pulse in the fluid stream is quite low. In the wide portion, heating element 3 is provided a 700 μs duration, 2.6 V pulse. The nominal resistance of heating element 3 is 75Ω, so the resulting average power over one duty cycle is approximately 45 mW. In the narrow portion, heating element 5 receives a rectangular voltage pulse of about 2 V amplitude and 300 μsec duration. The nominal resistance of heating element 5 is 27Ω, so the resulting average power over one duty cycle is approximately 72 mW.

The exact heater pulse amplitude, frequency, and duration may be varied; measurements of gas flow require less power than does liquid flow. Generally, a pulse of shorter duration than a characteristic time associated with the heat capacity and thermal diffusivity of a volume of water surrounding the sensor (for liquid flow) is appropriate. That is, short high amplitude pulses are most effective. Pulses which are short compared to the minimum delay time associated with the maximum flow velocity and the sensor spacing are also preferred. The pulse repetition rate is only limited by the delay time for the lowest flows; typically repetition rates of the power pulses up to about 100 Hz are used with the device of FIG. 1a. If the flow is known to be changing slowly, the repetition rate can be reduced, as would be desirable in a battery powered system.

The dynamic range is defined by the minimum and maximum measurable flow rates and in one embodiment is about 400:1. For very low flow rates, as low as 0.3 cc/hr in one embodiment, the flow sensor measures the higher fluid velocity $V_2$ in the narrow portion of the flow path. For higher flow rates, as high as 300 cc/hr in one embodiment, the flow sensor measures the lower fluid velocity $V_1$ in the wide portion of the flow path. It is to be understood that this wide/narrow approach is applicable to fluid flow measurement techniques generally, and is not restricted to pulsed heating or the use of two sensors. At very high flow rates for a given sensor the heat pulse amplitude decreases due to the heat pulse passing the sensor in a very short time, while at very low flow rates the heat pulse diffuses away to the channel walls before it can reach the downstream sensors. These limits are set for both stages (channel widths) of a dual stage device as shown in FIG. 1a, and an appropriate cross-over flow rate set between the use of the two stages.

Figure 4A:
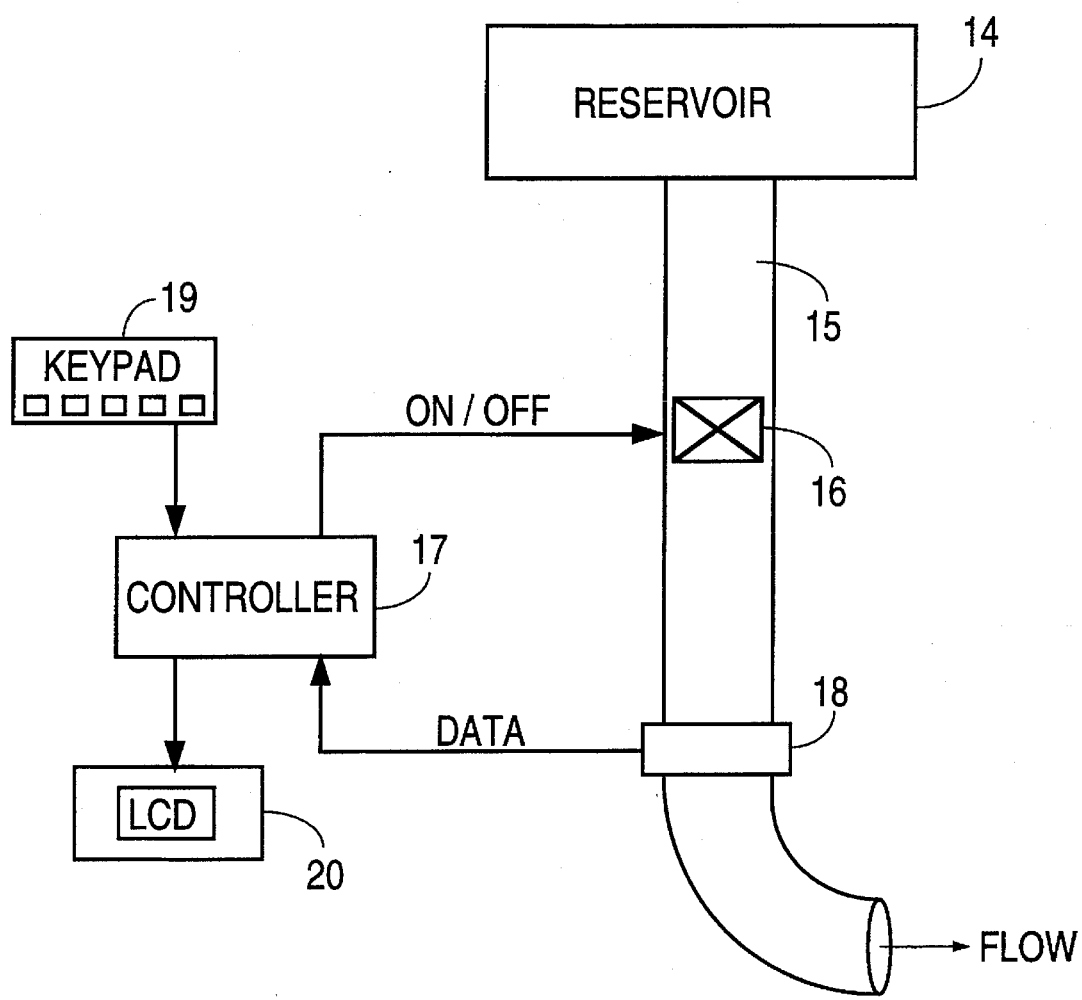
FIG. 4a shows the device of FIG. 1a in a closed loop flow control system.

The flow sensor of FIG. 1a is typically used in a closed loop flow control system as in FIG. 4a for instance for infusion of drugs where the flow rate is to be controlled, i.e. intravenous drug administration. Fluid reservoir 14 holds the fluid to be delivered to tubing 15. Inserted in tubing 15 is a conventional on/off solenoid valve 16 controlled by controller 17, described below. Flow sensor 18 is also installed in tubing 15 and provides data as to the measured flow rate to controller 17. Downstream of sensor 18 the fluid is provided, for instance by a conventional intravenous needle, to the patient. It is to be understood that such closed loop control systems for flow control are well known.

In use, the controller 17 first determines that valve 16 is off by checking for leaks (i.e., flow detected by sensor 18).

Thus when valve 16 is off it is determined if there is any flow through sensor 18. If there is a flow, i.e. a leak is present, the leak rate is computed by controller 17 from the data provided by sensor 18. Then this leak measurement is used to correct later flow calculations. Then, the presence or absence of a leak having been determined, valve 16 is opened by controller 17 and the presence of flow is checked by sensor 18, i.e. whether valve 16 has indeed opened, by means of sensor 18 measuring the flow rate. It is generally assumed that the flow rate is constant. Controller 17 computes how long valve 16 must be open to deliver a needed volume of fluid as determined by user input from keypad 19, conventionally operably connected to controller 17. Data as to the user input information and the measured flow rate is displayed by conventional LCD display 20, also conventionally associated with controller 17. Controller 17 includes a conventional 4-bit microprocessor having a resident control program for performing the control functions as described herein. Controller 17 also includes a conventional LCD controller for controlling the data displayed on LCD display 20.

Typically controller 17 operates valve 16 to be open for a brief period periodically (such as every two minutes) to deliver the desired amount of fluid as programmed into controller 17 via keypad 19. Thus controller 17 calculates the average required flow rate depending on the input fluid volume needed. The flow rate is measured by sensor 18 while the actual delivery of the fluid is provided by operation of valve 16. Sensor 18 measures the flow continuously, in one embodiment taking approximately 10 flow rate measurements per second. By integrating the flow rate over time it is possible to determine flow fluctuations, i.e. if the flow rate is not constant.

Controller 17 includes analog electronic circuitry for analyzing the data from sensor 18. (The conventional power source for the heater elements is not shown). The analog electronic circuitry includes a constant current source 20, amplification stage 22, differentiating stage 24, a comparison stage 26, and a latch stage 28 (see FIG. 4*b*).

The constant current stage 20 measures the changes in resistivity. When a constant current from current source 21 is applied across a resistor (the sensor elements), any change in resistivity causes a comparable change in voltage across the resistor (as determined by Ohms law). By using constant current source 21, the change in resistivity of each sensor element (not shown but connected to terminals 30) is tracked by the change in voltage. The constant current source 21 will heat the fluid via the connected sense resistor in the same fashion as it heats the heater element. It is therefore preferred to keep the power applied to the sense resistor much lower than that applied to the heater pulse.

Because of the low power requirement noted above, the signal from the sense element resistor in the flow sensor is very small. An amplification stage 22 including amplifiers 23, 32 raises the signal to usable levels. Also at this point, the signal is AC coupled in this embodiment to the amplifier 32 to allow for changes in ambient temperature.

At this point in the circuit, the signal is a voltage proportional to fast changes in the resistance of the sense resistor. It is needed to find the peak resistance of the sense resistor. Therefore, the signal is differentiated by differentiating amplifier stage 24 including amplifier 36. When the signal is differentiated, the output is directly related to the slope of the original waveform. When the peak resistance is reached, the output signal of an amplifier 36 changes sign from negative to positive. Although this negative-to-positive transition occurs during the peak resistivity, it can also occur when no signal is applied to the system whatsoever. This shows up as noise on the output and must be accounted for as described below.

A comparator 38 in comparison stage 26 detects the sense resistor's peak. Comparator 38 is used in conjunction with the differentiating amplifier 36. The output signal of the comparator 38 goes high when the differentiator 36 crosses through the zero, thus corresponding to the peak resistivity.

This alone is not enough to filter out the slope changes when no signal is present. To do this, a second comparator 40 determines when a signal is present. Although the signal is AC coupled to the amplifier stage 22, the time constant of the AC coupling is much greater than the signal length; therefore, the system works in a DC coupled environment during the duration of the sample. Thus a maximum noise threshold is determined for the signal. Any signal with more amplitude occurs only during a sample period. During this period, the zero point crossing out of the differentiator 24 is the crossing of interest. By connecting an input terminal of comparator 40 to the output terminal of the amplifying stage 22, and second input terminal of comparator 40 to a voltage source, which supplies a small voltage greater than the maximum noise value, an active region of interest is obtained at the output of comparator 40. Logically ORing in latch stage 28 the output signals of the two comparators 38, 40 together, a pulse with the leading edge corresponding to the peak resistivity of the sensor is obtained, without any spurious edges.

By using a second set of similar current 50, amplification 52, differentiating 54, and comparison 56 stages for the second of the two sense resistors, two pulses are obtained. The first pulse corresponds to the voltage across the first sense resistor, and the second pulse corresponds to the voltage across the second sense resistor. Using two latches 28, 58, the first signal latches a flip-flop 62 active high. The second pulse resets the first flip-flop 62 returning it to a low state. The output waveform at terminals 66 is the same as the time of flight between the two sense resistors.

The above-described electronics senses a change in resistance of the sensor elements by using a constant current source to maintain a low level current through the sensor, then observes changes in the voltage drop across the sensor elements. An alternative method provides a bridge connected to each sense element. The output signal of the bridge converts the change in resistance in the associated sensor element into a small voltage which is then amplified. Advantageously this bridge can be easily adjusted to accommodate the part-to-part variations in nominal resistance. Also, the output signal of the bridge corrects for changes in ambient temperature. Since the bridge includes only passive components, it reduces noise introduced into the output signal.

In a system as shown in FIG. 4*a*, a pulse of voltage provided to the heater element while an air bubble is passing by the heater element can cause the heater element to burn out due to insufficient heat dissipation by the air bubble, compared to the fluid normally present. One solution to this problem is to provide an additional heater element (see FIG. 4*c*) located on the silicon portion of sensor 18 but not in contact with the flow channel. This additional heater element is electrically identical to associated heater element in the flow channel. The two heater elements are connected as portions of the conventional null-seeking bridge circuit so the heater element in the flow channel is raised to a particular temperature, which is set by the other resistance values in the bridge.

This additional heater element also allows, in addition to preventing heater burnout, detection of the presence of bubbles in the sensor. These bubbles would typically confuse the flow measurements by sensor 18. The detection of the presence of a bubble thus would indicate to controller 17 not to report the measured flow at that time.

The additional heater element also allows driving of the heater element in the flow channel so as to maintain a controlled temperature, rather than the above-described method of providing a specified voltage for a predetermined time. In this controlled temperature mode, the amplitude or duration of the power pulse is adjusted using signal amplitude feedback to provide uniform signal strength.

Figures 1, 4B:
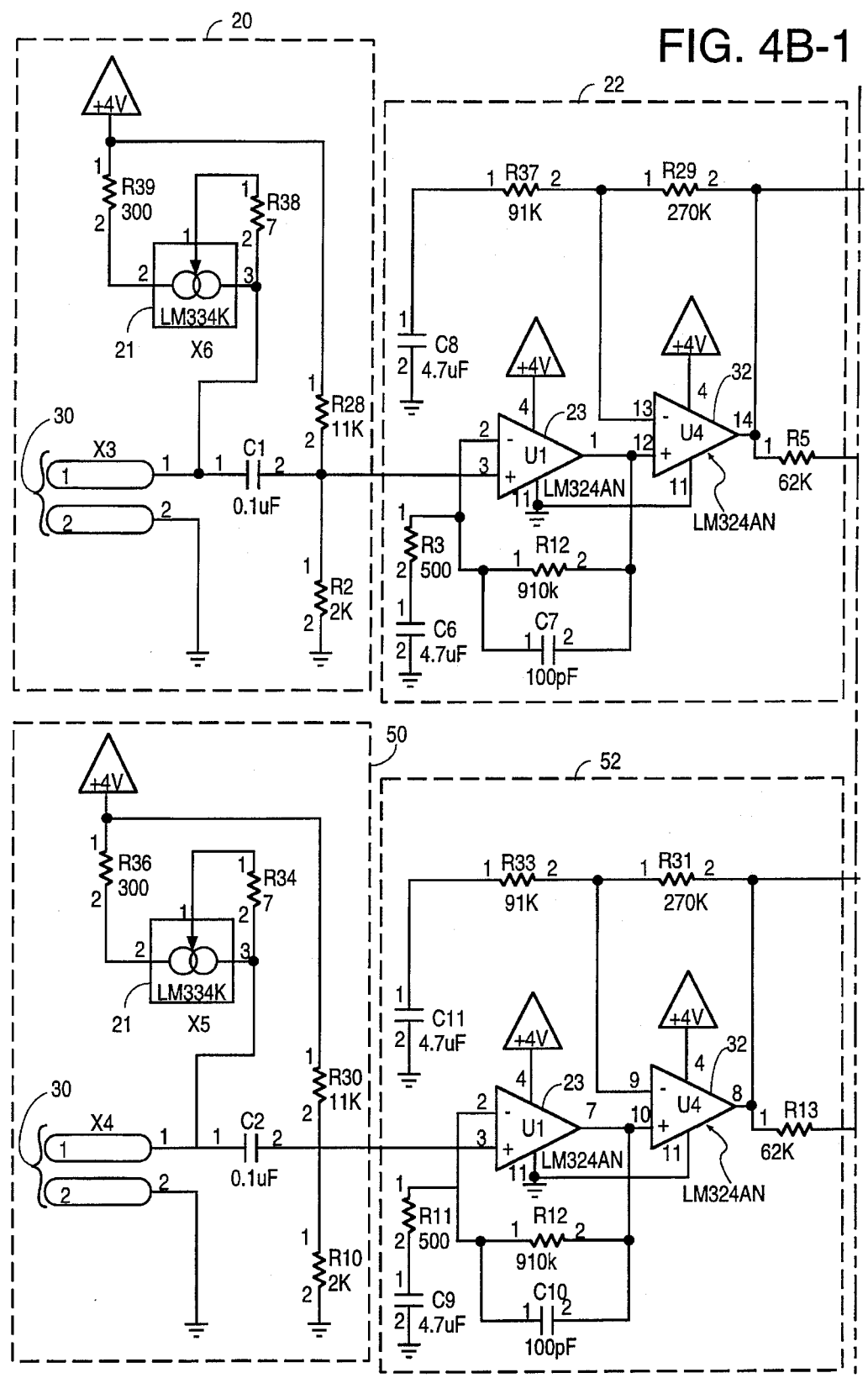
Figures 2, 4B:
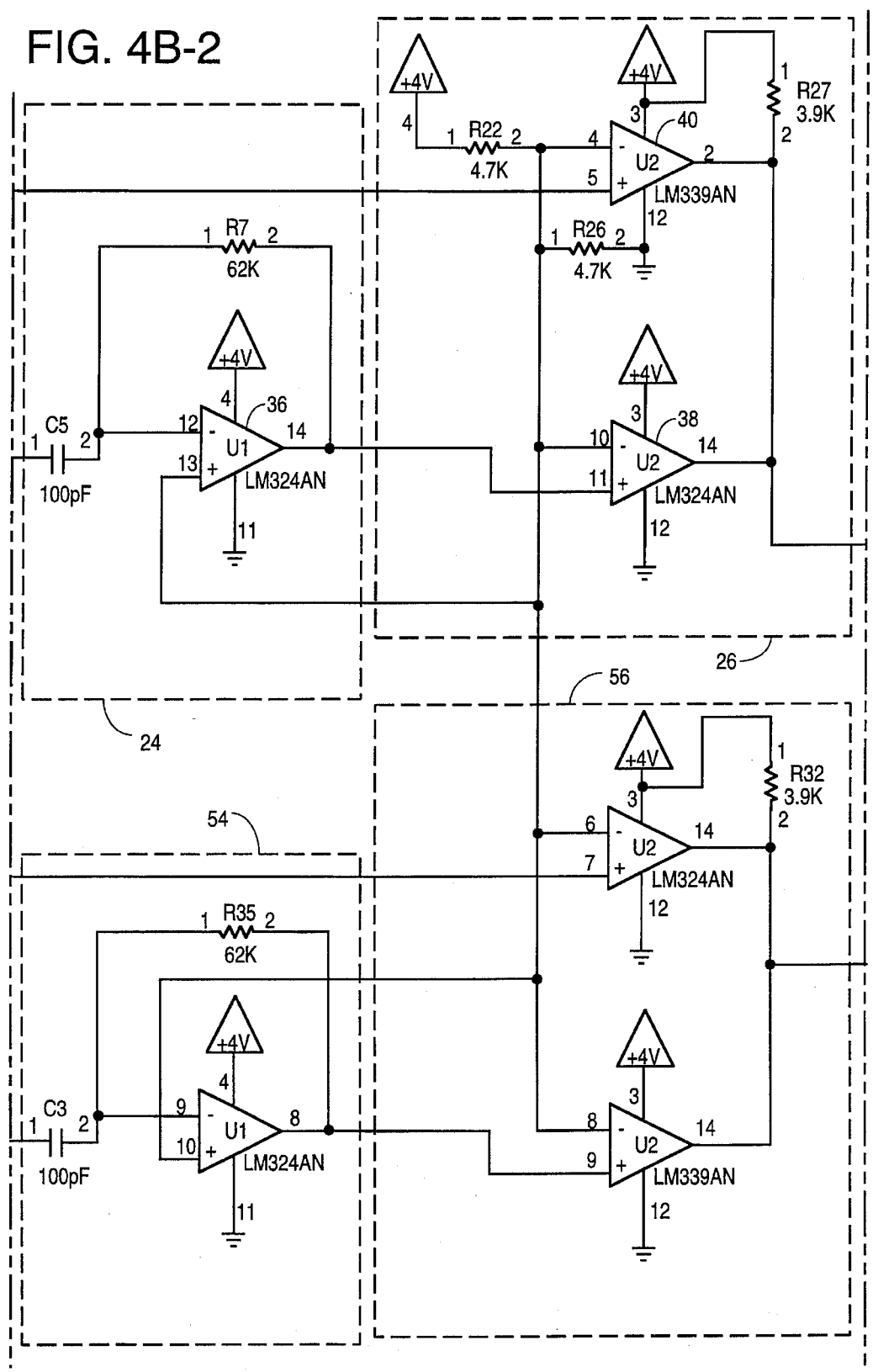
Figures 3, 4B:
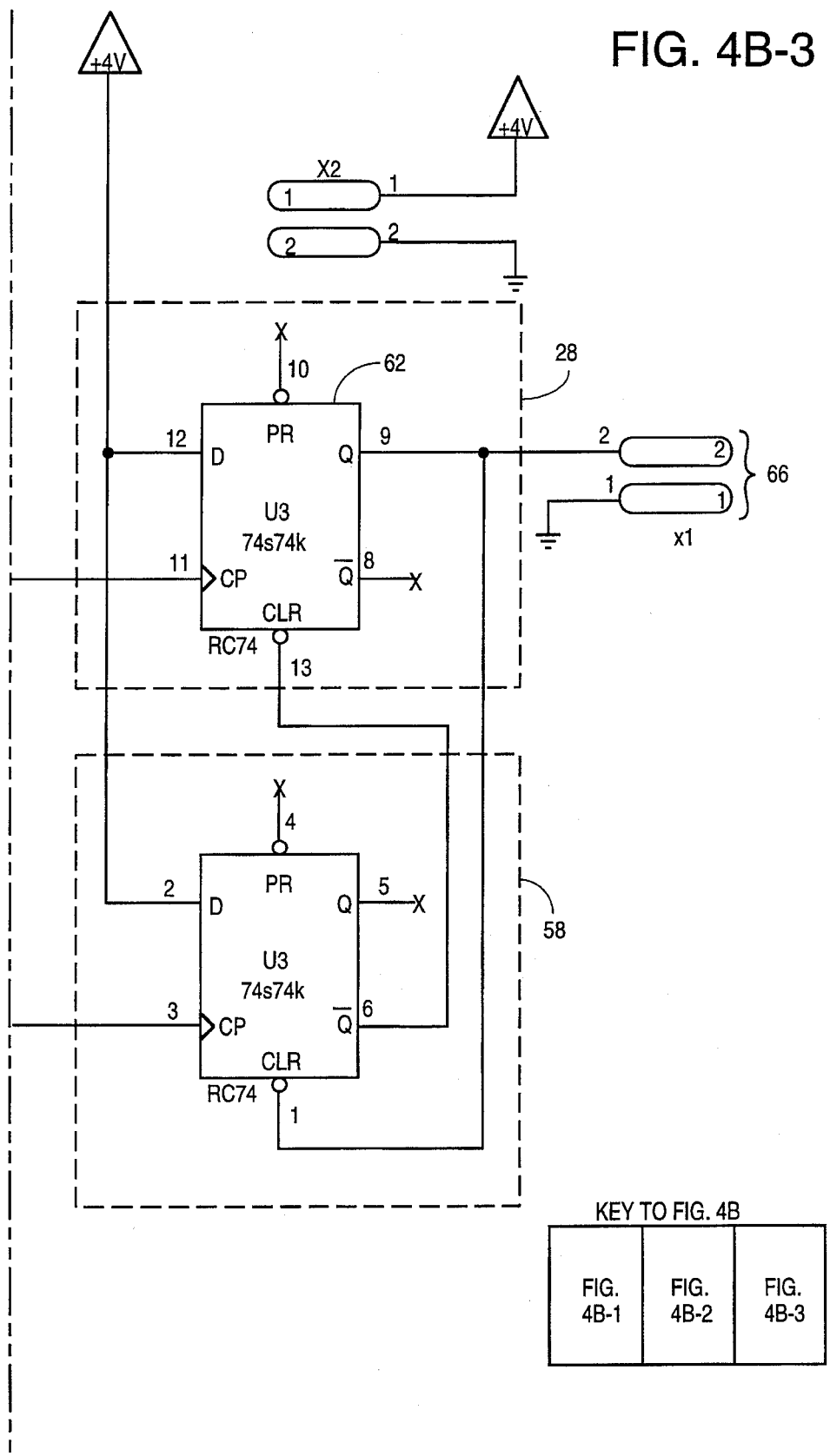

The above described circuitry of FIG. 4b includes AC coupling of the signal to the amplifier stage 22. The amplifier alternatively is one of four basic types, although some types are better suited for this application. The four types are:

|            | Single-ended Input | Differential Input |
|------------|--------------------|--------------------|
| AC Coupled: | Single/AC         | Differential/AC    |
| DC Coupled: | Single/DC         | Differential/DC    |

Single-ended inputs have the disadvantage of not rejecting common mode noise very well. An AC coupled amplifier (as described above) is not subject to slow drift of the signal caused by changes in ambient temperature.

The differential/DC type amplifier gives good signal fidelity and freedom from noise. By itself, it is susceptible to the drift of the signal already mentioned. A method of dealing with this drift is to add a baseline restoration circuit. This circuit is activated by the logic signal which starts the heater pulse. In the 150 μsec that follow, a null-seeking amplifier pulls the baseline to zero by adjusting the bias on the first amplification stage. The circuit is then de-activated. In typical operation, the rising edge of the thermal marker appears on the output from the first sensor 180 μsec or more after the start of the heater pulse. Thus, the baseline adjustment is over before the signal from the thermal marker arrives.

Figure 4C:
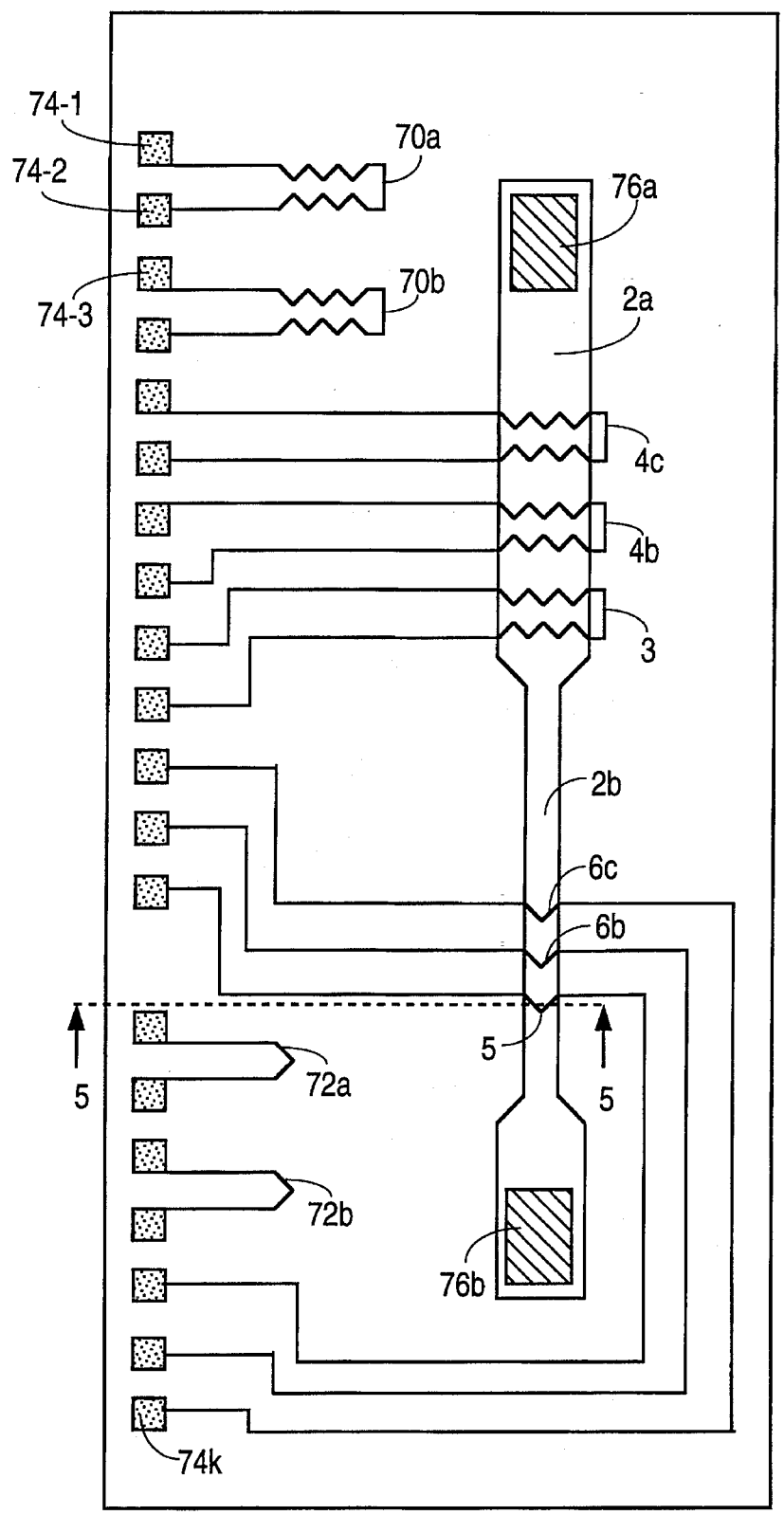
FIG. 4c shows a plan view of a device in accordance with the invention including extra on-chip heater elements.

FIG. 4c shows a device as in FIG. 1a with the addition of on-chip additional heater elements 70a, 70b associated with sensors 4b, 4c and additional heater elements 72a, 72b associated with sensors 6b, 6c. Also shown are bonding pads 74-1, . . . , 74-k and liquid feedthrough holes 76a, 76b. The other elements are as in FIG. 1a. The direction of flow is from bottom to top of FIG. 4c.

While different in origin, the effects of variations in ambient temperature and of part-to-part differences in nominal resistance are similar. The baseline of the signal will not always be the same. An alternate design for the sensor chip and its package addresses both of these issues, by providing for instance three or four additional sensor elements identical to those used for sensing the thermal marker. One or two of these additional sensor elements may be in the flow channel, upstream of the heater element. The other two may be on the silicon substrate. These elements are connected to their respective sense elements to form half bridges. In this way, drift due to ambient temperature changes is eliminated. The rest of the bridge is on the ceramic substrate on which the chip is mounted, in the form of laser trimmed resistors. These resistors are adjusted at the time of assembly, so that all flow sensor packages are electrically and thermally identical.

Another method of measuring rate of flow, using the above described chip but a different measurement approach, is the well known first moment method of flow rate sensing, which requires integrating the sensor output over time. Such methods are already known for use in other types of flow sensors. Another method, which might work best if used with heater control feedback to produce constant amplitude signals as described above, is to pick a level on the rising edge of the signals, and use it as a time marker.

A typical fabrication sequence for a flow channel as disclosed herein, with bridging members supporting resistive heating and sensing elements, is disclosed in Renken, et al., U.S. Pat. No. 4,542,650, incorporated herein by reference. FIGS. 5a to 5d show cross sections through line 5—5 in FIG. 4c illustrating fabrication of the structure of FIG. 4c. (It is understood that only one die of many on one wafer is shown here.) Beginning with silicon substrate 80, which is 400 μm thick and doped to a level of 1 Ω-cm with N-type dopant, a shallow depression 82, about 8000 Å deep and 20 μm wide is conventionally etched using a mask, to recess the later-formed metal traces. Then a layer of PECVD (plasma enhanced chemical vapor deposited) oxynitride 83 is deposited to a thickness of 1 μm over the principal surface of substrate 80 to serve as bottom insulation and support for the suspended metal traces that are the heaters and sensors.

Figure 5A:
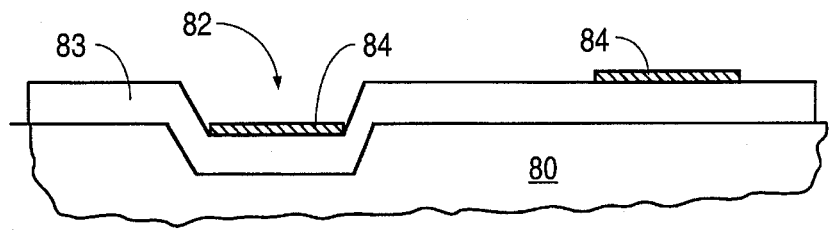
Figure 5B:
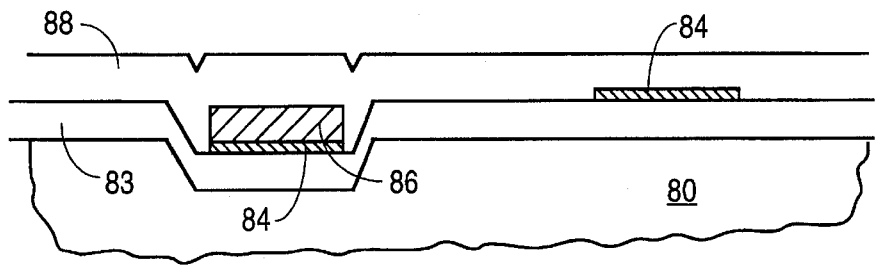

In FIG. 5a, layer 84 of platinum is conventionally deposited to a thickness of 3000 Å and patterned to serve as the heating resistors and sensors. Then in FIG. 5b a layer 86 of gold is conventionally deposited to a thickness of 5000 Å and patterned to serve as the lower resistance connections and for bonding pads. The thickness of the layer of gold is controlled to just reach the surrounding top thickness of layer 83. This insures a liquid tight seal from the fluid channel to the bonding pad region at the conclusion of the process. Then a second layer 88 of PECVD oxynitride is deposited to a thickness of 1 μm as a top passivation layer and support for the metal traces including metal layers 84, 86. Thus the metal sensor layers 84, 86 are enclosed by two oxynitride layers 83, 88 which insulate the metal layers 84, 86 from the flowing fluids (not shown). The platinum layer 84 and gold layer 86 are formed over a planar surface of substrate 80 to minimize steps which undesirably tend to cause breaks in subsequent passivation layer 88.

Figure 5C:
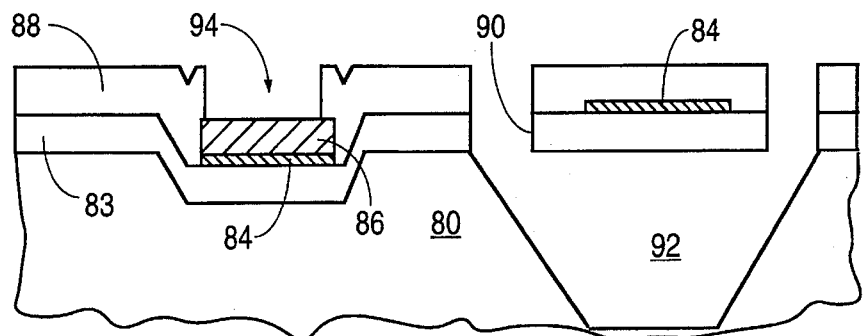

Then in FIG. 5c a silicon etch mask is conventionally formed and patterned to define the channel, suspended sensor and heater bridges. In the subsequent conventional anisotropic etch step these structures are formed including bridge 90 and channel 92.

Figure 5D:
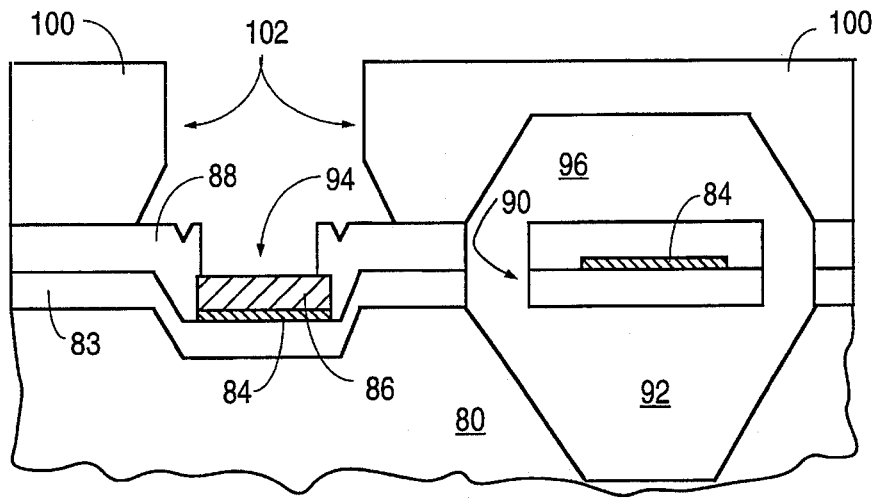

Then in FIG. 5d substrate 80 is anodically bonded to Corning type 7740 glass cap 100, in which mating flow channel 96 has already been isotropically etched. Then the substrate 80 is conventionally sawn through at 102 into multiple die to expose bonding pads 94.

In other embodiments, the channel and sensors and other materials may have other dimensions and fluid flow measurement techniques other than pulsed heating may be used. Also, the entire flow sensor may be made of glass with nitride supports for the heating element(s) and sensors. The entire sensor may be made of silicon using a silicon cap; this would result in a more precise cross-sectional area and hence a more precise device. In another embodiment, instead of one channel, the chip includes multiple (such as five) parallel channels having a common input and outlet, to divide the flow.

If the spacing between heater and sensor elements in a given section is chosen to be the same and the electrical resistance of those elements is similar, the heater and sensor elements can be switched electronically, such that the downstream sensor becomes the heater and the heater becomes the downstream sensor. In this manner bidirectional flow can be measured by alternatively measuring flow in both directions in the channel.

This disclosure is illustrative and not limiting; further modifications will be apparent to one skilled in the art in the light of this disclosure and are intended to fall within the scope of the appended claims.

What is claimed is:

1. An apparatus for measuring fluid flow comprising:

a substrate defining in its principal surface a conduit for flow of a fluid;

a first heating element for heating said fluid being inside said conduit;

at least two spaced-apart sensors being inside said conduit and positioned downstream of said heating element with respect to a direction of the flow for sensing a temperature of the fluid; and at least one additional heating element located on said principal surface and not in contact with said conduit, said additional heating element being electrically identical to said first heating element; and means for connecting said first heating element and said additional heating element in a bridge circuit.

2. The apparatus of claim 1, further comprising a cover having a channel defined therein;

wherein said cover is bonded to said substrate, said conduit being aligned with said channel.

3. The apparatus of claim 1, wherein said at least two spaced-apart sensors are spaced apart less than about 500 µm.

4. The apparatus of claim 1, further comprising circuitry for providing said first heating element with a power pulse.

5. The apparatus of claim 1, further comprising:

at least one additional sensor located on said substrate and not in thermal contact with the conduit; and conductors for electrically connecting said one additional sensor element to one of said at least two spaced-apart sensors.

6. A method of measuring a fluid flow rate through a conduit, comprising the steps of:

introducing a heat pulse into the fluid at a first location along said conduit;

measuring a temperature of said fluid at a second location along said conduit downstream of said first location and observing a first time when a first temperature is attained;

measuring a temperature of said fluid at a third location along said conduit downstream by a particular distance from said second location and observing a second time when a second temperature is attained;

determining the fluid flow rate as a function of the first and second observed times and said particular distance;

measuring an abrupt decrease in heat dissipation at said first location; and in response, reducing an amount of power used to provide heat at said first location.

7. The method of claim 6, wherein said particular distance is less than about 500 µm.

* * * * *